March 8, 1938.    G. F. JOHNSTONE    2,110,487
ELECTRICAL ETCHING MACHINE
Filed March 25, 1935    3 Sheets-Sheet 1
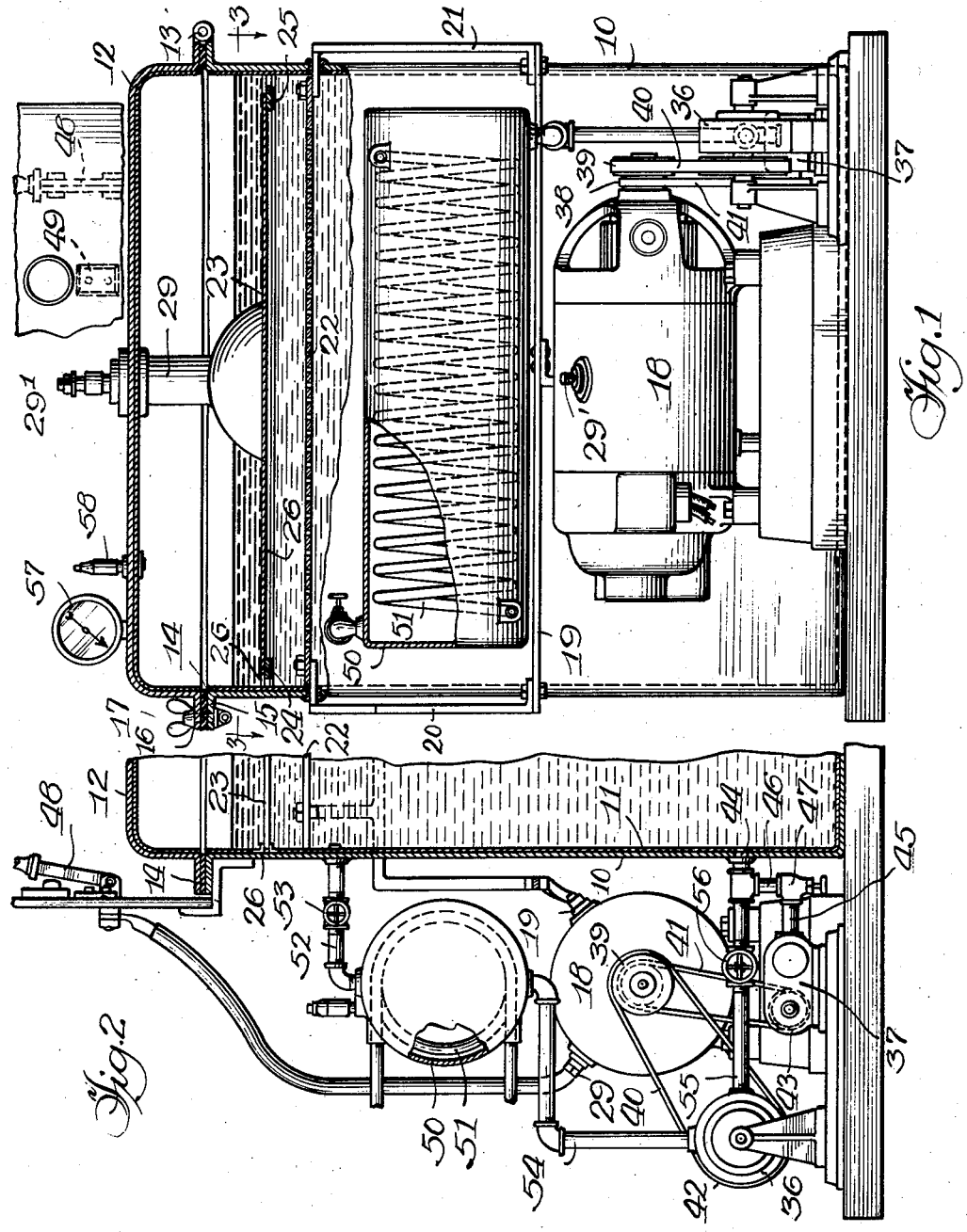
Inventor
George F. Johnstone

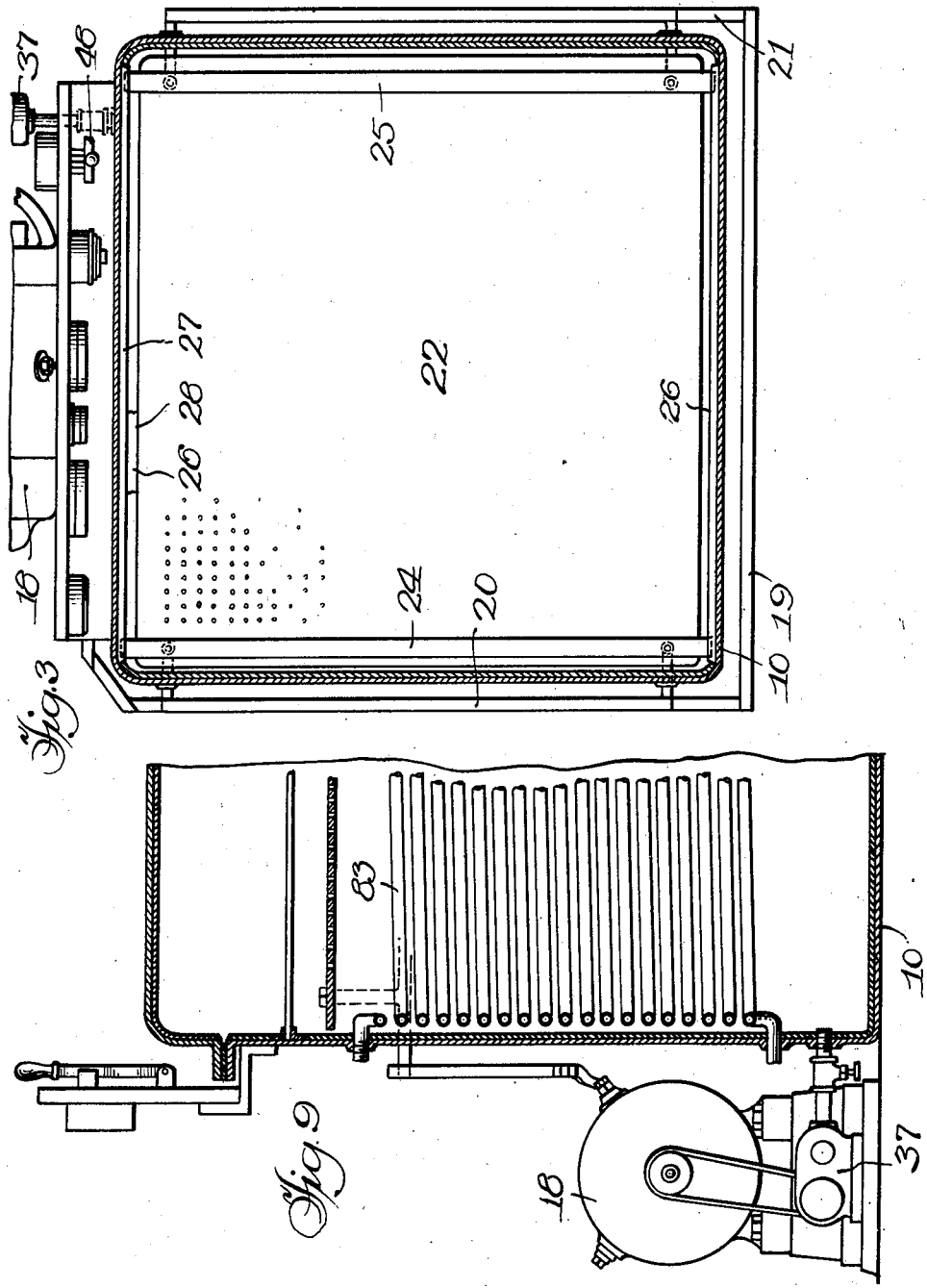

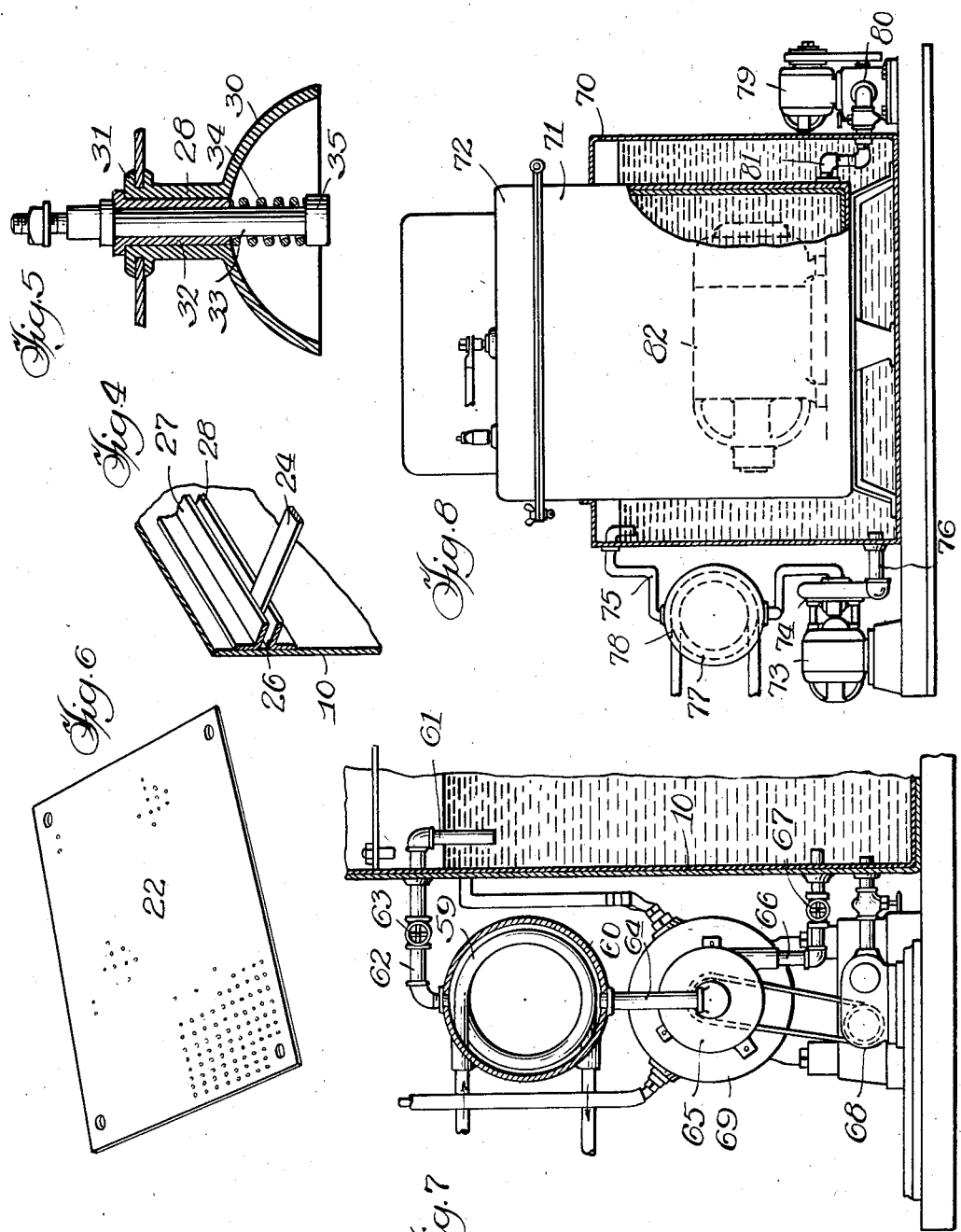

Patented Mar. 8, 1938

2,110,487

UNITED STATES PATENT OFFICE 2,110,487

ELECTRICAL ETCHING MACHINE

George F. Johnstone, Chicago, Ill.

Application March 25, 1935, Serial No. 12,923

13 Claims. (Cl. 204—5)

The invention relates to electrical etching machines which usually employ an anode, a cathode and an electrolyte and has as its principal object the provision of a method and means capable of accomplishing the production of a plate for use in the printing industry and which materially reduces the time period necessary for this accomplishment.

The invention is particularly adapted for use in the production of zinc printing plates which heretofore could not, to my knowledge, be successfully produced by electrolytic action.

It is another object of the invention to accomplish etching of a plate under pressure, above atmospheric pressure, the pressure being applied to the electrolyte during the etching operation.

It is another feature of the invention to provide means for cooling the electrolyte to thereby maintain the electrolyte at a temperature sufficiently low to prevent dissolving or removal of insulating material applied to certain portions of the plate to insulate same against the etching action.

The invention has as another object the provision of means for cooling the electrolyte by subjecting the latter to the effects of a cooling agent either during or subsequent to the etching operation.

The invention has these and other objects all of which will be explained in detail and more readily understood when read in conjunction with the accompanying drawings which illustrate various embodiments whereby the various objects of the invention may be accomplished it being therefore manifest that other arrangements may be resorted to without departing from the spirit of the appended claims forming a part hereof.

Figure 1 is a rear elevation of an etching machine, partially in section illustrating a certain combination and arrangement of elements for accomplishing the above enumerated and other objects.

Figure 2 is a partial end view of the structure illustrated in Figure 1 showing certain portions in section.

Figure 3 is a sectional view taken on line 3—3 of Figure 1.

Figure 4 is a perspective view showing a detail of the construction illustrated in Figure 3.

Figure 5 is a sectional view of a terminal employed in the device.

Figure 6 is a perspective view of a cathode employed in the machine.

Figure 7 is a side view similar to Figure 2, showing a modified arrangement of elements.

Figure 8 is a front view of another structure whereby the invention may be accomplished; and Figure 9 is a sectional view of a fragment of an etching machine showing a modified cooling structure which may be employed for cooling the electrolyte.

It may be here stated that one phase of the invention contemplates the provision of means for supplying air under pressure above atmospheric pressure to a receptacle containing an electrolyte, anode and cathode, and to accomplish etching under this pressure and another phase of the invention is to maintain the electrolyte in a relatively cool condition preferably between 70° and 100° F. which temperature it has been found does not effect removal of the insulating or protective coating applied to certain parts of the plate to be etched.

The invention also contemplates the accomplishment of a cooling effect, by means of any one of a plurality of means which will hereinafter be referred to in detail. The apparatus disclosed in Figures 1 and 2 for accomplishing the above enumerated and other objects, contemplates withdrawal of a portion of the electrolyte from the receptacle after completion of an etch and subjecting the electrolyte to the cooling effect of a cooling medium and then returning the electrolyte to the receptacle for subsequent use.

The apparatus just referred to, also contemplates the provision of means for supplying air under pressure above atmospheric pressure to the receptacle, containing the electrolyte so that the electrolyte is subjected to the influence of this pressure during the etching operation. The structure illustrated in Figures 1 and 2, contemplates the utilization of a receptacle 10, which is lined with rubber or some other suitable insulator designated 11 which protects the metallic receptacle against electrolysis during the etching operation. This receptacle has a closure 12, the latter being hinged to the receptacle 10 as indicated at 13, it being understood that a suitable gasket 14 is interposed between the flanges 15 and 16, which flanges are respectively formed upon the receptacle and the closure.

The closure 12 is held relatively to the receptacle to prevent leakage of air from the receptacle through the medium of a plurality of wing nuts 17 which releasably hold the cover in tightly closed relation with the gasket 14 which thus prevents leakage of air from within the interior of the receptacle. A motor generator 18 is employed. This motor generator has a bus-bar 19 connected therewith, to which conductors or bars such as 20 and 21 are connected to complete an electrical connection with the cathode 22. The cathode in the present instance is of a perforated character and is located below the level of the liquid electrolyte contained in the receptacle 10, the plate to be etched or anode is designated 23 and is supported in the receptacle at one side or above the cathode. Means is provided for supporting the anode in proper relation to the cathode and within the electrolyte.

This means involves the use of adjustable elements such as those respectively designated 24 and 25 which are mounted for adjustment relatively to each other to thus provide a support capable of adjustment to accommodate a plate of a length and width of that designated 23 or one of another dimension.

These adjustable elements 24 and 25 are slidably mounted in guide-ways 26, located at the front and rear and interiorly of the receptacle 10. These guides 26 are, in the present instance, formed of bars or angle iron members 27 and 28 as clearly shown in Figure 4. Manifestly the adjustable elements 24 and 25 may be moved to any desirable position along the grooves formed by the elements 27 and 28 and therefore these adjustable elements may be arranged relatively to each other to accommodate plates of various sizes or dimensions.

A terminal or contact element generally designated 29, is carried by the cover or closure 12 and is in turn electrically connected with a terminal 29' extending from the motor generator 18, and therefore operation of the generator will cause current to flow from the generator to the anode and through the electrolyte to the cathode. The construction of the contact element 29 involves a cup-shaped flexible member 30 which is preferably formed of rubber or rubber composition and is securely connected with the closure 12 through the connecting portion 31 thereof.

In the particular contact element or terminal 29 illustrated, a metallic sleeve 32 is employed, in which the contact element 33 is resiliently and reciprocably mounted. A coil spring 34 is provided upon one end of the contact element 33 and this spring re-acts between one end of the sleeve 32 and the head or enlargement 35 provided upon the contact 33 and allows for reciprocable motion of the said contact.

The cup-shaped element 30 surrounds the lower end of the contact element 33 and a part thereof also encloses the sleeve 32, and since the part 31 of the cup shaped element is interposed between this sleeve and the material of the cover the contact element 33 is thoroughly insulated from the remaining structure. In the particular apparatus illustrated in Figures 1 and 2 for effecting etching of a plate, the motor generator designated 18 provides means for operating a suction fluid pump 36 and also an air pump such as that designated 37. To this end the shaft of the motor generator is provided with pulleys respectively designated 38 and 39 from which belts respectively designated 40 and 41 are entrained over pulleys respectively designated 42 and 43 to thus provide means for respectively driving the fluid pump and air pump respectively designated 36 and 37. It is believed evident that since the air pump 37 is connected with the interior of the receptacle 10, through the pipe connection 44, operation of the motor generator will introduce air to the receptacle through this connection and create a pressure in the receptacle above atmospheric pressure which is applied to the electrolyte contained in the receptacle and therefore will in this manner assist in reducing the time period necessary in which to produce a plate having characteristics capable of use in the printing industry.

The air pump 37 is connected with the air inlet 44 through the pipe connections 45 and 46. A valve 47 is located between the outlet of the pump 37 and the in-let 44, and therefore when the required pressure obtains within the receptacle 10, the valve 47 is manipulated to close the same and prevent the formation of pressure in excess of a prescribed amount, indicated by the pressure gauge 57 carried by the closure or cover 12.

It is evident that when the main line switch 48 and the starting switch 49 are closed this will cause operation of the motor generator which causes current to be supplied to the anode, cathode and the electrolyte contained within the receptacle 10. It is further believed manifest that the pump 37 will at this time also be actuated, and should the valve 47 at this time be open, air under pressure is pumped to the receptacle 10, which will thus supply the required pressure to the receptacle 10, and the electrolyte contained therein. This has been found not only to increase production of a plate, but in addition to make possible the successful production of a zinc printing plate which heretofore could not, to my knowledge, be successfully accomplished.

As before stated, it has been found that during the etching operation the electrolyte becomes heated, and when the temperature reaches a certain degree, for instance, above 100° F., it causes a melting effect to be applied to the insulating material employed to insulate certain portions of the plate from the attack of the electrolytic action.

It is believed evident that when melting of the protective coating or insulation applied to the plate occurs, this will expose those portions which it is desired to protect against the etching effect and allow these portions to be etched away resulting in rendering the plate worthless for use in the printing industry.

To eliminate this disadvantage and maintain the electrolyte at a certain relatively cool temperature, various methods may be resorted to, that shown in the structure illustrated in Figures 1 and 2 contemplates the utilization of a reservoir 50 in which is contained a cooling coil 51 through which a cooling medium is circulated in engagement with a quantity of electrolyte contained in the reservoir 50. This reservoir 50 is connected with the interior of the receptacle 10 by means of a pipe connection 52 having a valve 53 interposed between the opposite ends of the pipe connection 52 and the reservoir 50.

An outlet pipe connection 54 extends from the lower portion of the reservoir 50 to the suction fluid pump generally designated 36. A fluid outlet pipe connection 55 extends from the pump 36 to the interior of the receptacle 10, and a valve 56, is interposed between the pump 36 and the air and fluid pump 37. It is, of course, understood that during the introduction of air to the receptacle 10 the valve 56 is closed as is also the valve 53.

When the etching operation is completed the valve 53 is opened, the air pressure above atmospheric pressure contained within the receptacle, causes a certain quantity of the electrolyte to be forced from the receptacle into the reservoir 50 wherein it is subjected to the cooling effect of the cooling medium circulating through the cooling coil 51. The air release valve 58 is then operated to allow air to enter the receptacle and compensate for any reduced air pressure condition which may at this time be present in the receptacle 10. The wing nuts 23 are then released and the cover lifted to expose the plate which may then be inspected for depth of etch and other matters such as under cutting, etc.

If the plate is found in proper condition as to depth, etc., it is removed from the receptacle and another replaced therefor, the receptacle is then closed, the valves 53 and 56 opened, operation of the pump 36 will draw the cooled electrolyte from the reservoir 50 and again introduce it in its cooled condition to that electrolyte remaining in the receptacle 10. After the reservoir has been emptied, the valves 53 and 56 are again closed and the valve 47 opened, so that the electrolyte now contained in the receptacle may have the required air pressure applied thereto to assist in accomplishing the etching effect.

The structure illustrated in Figure 7 contemplates the provision of means whereby a constant circulation of the electrolyte from the receptacle 10 is accomplished to effect cooling of the electrolyte. In this structure a cooling medium is circulated through the cooling coils 59 contained in the reservoir 60. To accomplish this constant circulation of the electrolyte as hereinbefore referred to, a pipe such as 61 is extended into the electrolyte. This pipe has a pipe connection 62 connected therewith which communicates with the reservoir 60, and is provided with the valve 63 which may be closed when occasion demands. An outlet pipe connection 64 extends from the reservoir 60 to the fluid pump 65, the latter of which has a pipe connection 66 extending into the receptacle 10. This last mentioned pipe connection 66 may be provided with a valve 67, so that circulation of the electrolyte may be arrested, which will thereby trap air above atmospheric in the receptacle should this at any time be found necessary or desirable.

The use of an air pump 68 as previously described is also contemplated in this structure, to provide means to supply air above atmospheric pressure to the interior of the receptacle. The apparatus illustrated in Figure 7 also involves the use of a motor generator designated 69, the latter being in electrical connection with the anode and cathode as hereinbefore explained.

It is understood that the device just referred to may have certain of the various elements and devices referred to in the explanation of the structure illustrated in Figures 1 and 2 combined therewith. The structure illustrated in Figure 8 contemplates a structure in which a cooling medium is circulated in effective relation with the electrolyte contained within a receptacle such as that previously referred to. The structure illustrated in Figure 8 for accomplishing this last mentioned advantage, may employ a tank 70 within which a receptacle designated 71 is mounted containing the electrolyte, anode and cathode.

This last mentioned receptacle has a closure 72 which may involve structural features such as explained in connection with the description of Fig. 1. The tank 70 contains a suitable quantity of any desired cooling medium and for the purpose of simplicity of illustration a separate motor 73 is illustrated for actuating the fluid pump 74, the later of which communicates with the interior of the tank 70 through the pipe connections respectively designated 75 and 76.

Manifestly when the motor 73 is actuated the pump 74 will draw the cooling medium from the tank 70 through the pipe connection 75 and discharge same back into the receptacle 70 which will cause a constant circulation of the cooling medium as hereinbefore explained. It may be here stated that a cooling coil 77 may be employed, the latter of which may be contained within a reservoir 78 as previously explained, however, any other desirable arrangement may be substituted for that shown.

In this structure as in others previously referred to it is contemplated to supply air under pressure above atmospheric pressure to the receptacle 71, to this end a motor 79 may be employed for actuating the air pump 80. In this structure the pump 80 is connected through the medium of the pipe connections 81 to the interior of the receptacle 71. A motor generator 82 is employed, it being understood that proper electrical connections as previously explained are made from this motor generator to the anode and cathode, and it may here be stated that the pumps 74 and 80 may be actuated directly from the motor generator as explained in connection with previously referred to structures.

From the foregoing explanation of the structure illustrated in Figure 8, it is believed manifest that an arrangement is herein illustrated in which the cooling medium is constantly circulated in effective relation with the electrolyte, to thus maintain the latter in a relatively cool condition, which thus differs from that structure disclosed in Figure 7 in which the electrolyte is constantly circulated into effective relation with a cooling agent. In the apparatus illustrated in Figure 9 the cooling element is located within a receptacle such as previously designated 10 and the cooling medium is circulated in effective engagement with the electrolyte, through a cooling coil 83 which is housed within a receptacle such as 10.

The cooling fluid being circulated through the cooling coil 83 to thus maintain the temperature of the electrolyte relatively low. It is understood that a structure such as last referred to may have an air pump associated therewith to subject the electrolyte to pressure above atmospheric pressure as previously explained.

From the foregoing description of the various embodiments of the invention it is believed evident that, the various forms of the invention all lend themselves to the accomplishment of etching under pressure above atmospheric pressure and in addition disclose means for maintaining the electrolyte in a relatively cool condition so that constant etching may be accomplished without resulting in an injurious temperature rise of the electrolyte which as before pointed out causes the insulating material applied to the plate to be etched to dissolve and become detached from the plate which thus exposes and allows etching of portions of the plate which should be protected against the etching action to accomplish the production of a printing plate.

Having thus described the invention what I claim and desire to cover by Letters Patent is:

1. In an etching machine the combination of a closed receptacle, an electrolyte in said receptacle, a cathode and a terminal for an anode extending into said receptacle and means for introducing air under pressure above atmospheric pressure to said closed receptacle to thereby apply pressure to said electrolyte.

2. In an etching machine the combination of a closed receptacle, an electrolyte in said receptacle, a cathode and a terminal for an anode extending into said receptacle, means for introducing air under pressure above atmospheric pressure to said receptacle to thereby apply pressure to said electrolyte and means associated with said receptacle for cooling said electrolyte.

3. In an etching machine the combination of a closed receptacle sealed against the escape of air therefrom, an electrolyte and a terminal for a cathode arranged in said receptacle and an air pump communicating with said receptacle and providing means for supplying air under pressure above atmospheric pressure to said closed receptacle.

4. An etching machine comprising in combination a receptacle having a closure, said closure preventing the scope of pressure therefrom, an electrolyte and terminals for an anode and cathode arranged in said receptacle, means whereby said electrolyte is circulated to and from said receptacle and means for applying air under pressure above atmospheric pressure to said electrolyte.

5. An etching machine comprising in combination a receptacle sealed against escape of air therefrom, and terminals for an anode and cathode arranged in said receptacle, means for circulating an electrolyte to and from said receptacle and means for supplying air pressure above atmospheric pressure to said receptacle.

6. An etching machine comprising in combination a closed receptacle, an electrolyte and terminals for an anode and cathode arranged in said receptacle, and a cooling agent surrounding said receptacle, means for circulating said cooling agent relatively to the electrolyte, means for supplying air at a pressure above atmospheric pressure to said closed receptacle and means for trapping said air in the receptacle.

7. An etching machine comprising in combination a closed receptacle, a container in which said receptacle is located, an electrolyte and terminals for an anode and cathode arranged in said receptacle, and a cooling agent located in said container in effective relation with said electrolyte, means for circulating said cooling agent relatively to the electrolyte, means for supplying air at a pressure above atmospheric pressure to said closed receptacle and means for trapping said air in the receptacle.

8. In an etching machine, the combination of a receptacle providing a container for an electrolyte and air above atmospheric pressure, a terminal for an anode and a terminal for a cathode arranged in said receptacle and an independently effective air pump for creating said pressure and a pump for pumping liquid connected with said container.

9. An etching machine comprised of a receptacle providing a container for an electrolyte and air at a pressure above atmospheric pressure, terminals for an anode and a cathode in said receptacle, a reservoir providing means for the reception of said electrolyte communicating with said receptacle, an air pump and a pump for pumping liquid connected with said container and means for independently controlling the effect of said pumps.

10. An etching machine comprised of a receptacle providing a container for an electrolyte and air at a pressure above atmospheric pressure, terminals for an anode and a cathode arranged in said receptacle, a reservoir communicating with said receptacle providing means for the reception of said electrolyte, said receptacle having a closure for sealing said receptacle, one of said terminals being carried by said closure.

11. An etching machine comprised of a receptacle providing an open container for an electrolyte, a terminal for a cathode arranged in said receptacle adjacent said opening, a closure for sealing said opening and a terminal for an anode carried by said closure.

12. An etching machine comprising in combination a receptacle providing a container for an electrolyte and air at a pressure above atmospheric pressure, a cathode arranged in said receptacle, an anode support arranged at one side of said cathode, a closure for said receptacle and a terminal carried by said closure for cooperation with said anode.

13. An etching machine comprising in combination a receptacle providing a container for an electrolyte and air above atmospheric pressure, a closure for sealing said receptacle, terminals for an anode and a cathode arranged in said receptacle, means for introducing said air at said pressure to said receptacle and means for releasing said pressure prior to the opening of said receptacle.

GEORGE F. JOHNSTONE.